April 27, 1954 S. C. ROCKAFELLOW 2,677,052
ELECTRONIC TIMING DEVICE
Filed March 15, 1949 2 Sheets-Sheet 2

FIG. 2.

INVENTOR.
Stuart C. Rockafellow
BY
Barnes, Dickey & Pierce
ATTORNEYS.

Patented Apr. 27, 1954

2,677,052

UNITED STATES PATENT OFFICE 2,677,052

ELECTRONIC TIMING DEVICE

Stuart C. Rockafellow, Farmington, Mich., assignor to Weltronic Company, Detroit, Mich., a corporation of Michigan Application March 15, 1949, Serial No. 81,500

20 Claims. (Cl. 250—27)

This invention relates to electronic timing devices and is particularly adapted among other uses for the timing of a plurality of a sequence of operations as for example, those of a welding machine.

An object of this invention is to provide a new arrangement of electrical apparatus which is simple and economical of construction, and which will require a minimum of maintenance.

Another object is to provide such an apparatus which uses a lesser number of electronic control valves than similar devices of the prior art.

Another object of this invention is to provide such an apparatus which is accurate in its timing functions.

Another object of this invention is to provide such a system in which successive valves have their corresponding main electrodes connected in opposite polarity to a source of alternating potential.

Another object is to provide a timing system in which the number of sources of electrical energy for the electronic valves is substantially reduced.

Other objects will be apparent from the appended claims, the specification and the drawings in which drawings:

Figure 1:
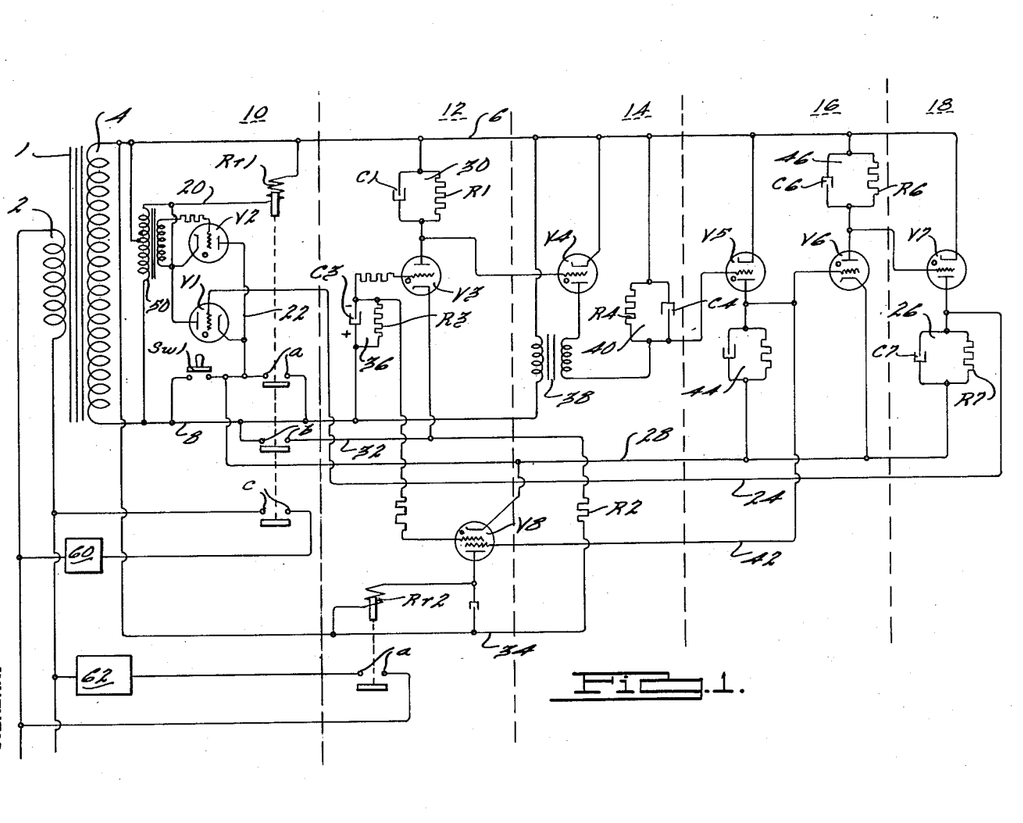
Figure 1 is a schematic view of an electrical control circuit embodying the invention.

Referring to the drawings by characters of reference, I designates a transformer having a primary winding 2 adapted to be connected to a suitable source of alternating current energy and having a secondary winding 4. A bus 6 is connected to the one terminal of the secondary winding 4 while a bus 8 is connected to the other terminal of this winding 4. Connected between the busses 6 and 8 are a plurality of discontinuous control-type electronic valves V1 through V8 inclusive arranged for successive or cascade operation for controlling a plurality of networks 10, 12, 14, 16, and 18. The network 10 is the initiating network and is selectively energized by means of the manually closable switch Sw. The network 12 is a timing network determining the length of time between the initiation of the flow of the welding current and the initiation of the clamping movement of the welding electrodes whereby they will have time to move into welding position with respect to the work. Since such structure for moving the electrodes into engagement with the work is old and well known in the art there is shown in the drawings merely a set of contacts operated by the relay Rr1, and controlling the hereinafter described element 60, for initiating this operation. Subsequent to the expiration of a predetermined time interval, the welding current controlling network 14 is energized closing the relay Rr2 whereby welding current is permitted to flow to the welding electrodes in the usual manner, not shown. Subsequent to a predetermined welding time interval, the network 16 operates to maintain the electrodes clamped against the work while the network 18 acts to determine a desired length of "off-time" interval between succeeding welding operations.

Referring now more specifically to the constructional details of the network 18, the valves V1 and V2 are arranged in back-to-back relation whereby the anode of valve V1 is connected to the cathode of valve V2 and the anode of valve V2 is connected to the cathode of valve V1. The valve V2 is arranged in a trailing manner with the valve V1 so that it will conduct each half cycle of the voltage wave subsequent to the conduction of the valve V1. This arrangement is shown in my copending application, Serial No. 711,430, filed November 21, 1946, now Patent No. 2,587,385, dated February 26, 1952, for Electrical Control System. Briefly, during nonconducting periods of valve V1, the energized one-half of the primary winding of transformer 50 causes the secondary thereof to apply a blocking bias to the grid of valve V2. If valve V1 becomes conducting, currents oppositely flowing in the two portions of the primary winding of transformer neutralize each other, eliminating this blocking bias and conditioning valve V2 to conduct at the beginning of the next half cycle of the source.

The anode of valve V1 and cathode of valve V2 are connected by means of conductor 20 to one terminal of the energizing winding of the relay Rr1, the other terminal thereof being connected to the bus 6. The cathode of the valve V1 and the anode of the valve V2 are connected by means of conductor or lead wire 22 through the switch Sw to the bus 8. The lead wire 22 is also connected to the bus 8 in parallel with the switch Sw through the contacts a of the relay Rr1. The grid of the valve V1 is connected by means of leads wire 24 to the anode of valve V7 of the "off-time" network whereby the potential drop across the timing network 26 will appear between the grid and cathode of the valve V1 for a purpose to be brought out below. It will be noted that the one terminal of the timing network 26 is directly connected to the anode of the valve V7 while the other terminal of the network 26 is connected by means of a bus 28 to the cathode of the valve V1 so that it may be connected through the contacts a of the relay Rr1 or the switch Sw to the bus 8. Under normal standby conditions the valve V1 is held in a blocked condition as also will be described below.

The clamping network 12 comprises the valve V3, the anode of which is connected to the bus 6 through a biasing network 30 comprising parallelly connected capacitor C1 and a resistor R1. The cathode of the valve V3 is connected to a bus 32 connected through the normally open contacts b of the relay Rr1 to the bus 8 and through a resistor R2 and conductor 34 to the bus 6. When the relay Rr1 is de-energized and its contacts b are open, the cathode of the valve V3 will be at substantially the potential of the bus 6 while with the relay Rr1 energized and its contacts b closed, the bus 32 will be at the potential of the bus 8, the drop between the busses 6 and 8 being substantially across the resistor R2.

The grid of the valve V3 is connected through the usual grid resistor and through a timing network 36 to the bus 8. Therefore, during the time that the relay Rr1 is de-energized and the bus 32 is at substantially the same potential as the bus 6, the grid of the valve V3 will act as a supplemental anode permitting current to flow from the bus 8 through the valve V3 to the bus 6 for charging the capacitor C3 of the network 36. The polarity of this charge is plus and minus as indicated on the drawings. Since the potentials of the anodes and cathodes of the valve V3 are substantially identical, no current will flow through the valve V3 between its anode and cathode. Immediately upon closure of the contacts b of the relay Rr1, the potential of the cathode of the valve V3 is placed substantially at the potential of the bus 8. Initially, the valve V3 will remain nonconductive since this transfer of the potential of the cathode of the valve V3 from that of the bus 6 to that of the bus 8 enables the capacitor C3 to maintain the grid negative and the valve V3 blocked. The capacitor C3, however, will commence to discharge through its companion resistor R3 and after a predetermined time interval known as the "clamping time" the negative charge on the grid of the valve V3 will be reduced allowing the valve V3 to conduct. The valve V8 of the network 12 has its cathode connected to the bus 28 and its anode connected through the energizing winding of the relay Rr2 to the bus 34. The main control grid of the valve V8 is connected through the usual grid resistor to the terminal of the network 36 adjacent the grid resistor of the valve V3 so that (after closure of contacts a and b of relay Rr1, as described below) the bias potential between the control grid and cathode of the valve V8 is substantially the same as that appearing between the grid and cathode of the valve V3. The screen grid of the valve V8 is connected by means of lead wire 42 to the anode of the valve V5 of the "off-time" network 16.

The welding time network 14 comprises the valves V4 and V5. The anode potential for the valve V4 is supplied by the transformer 38, the primary winding of which is connected between the busses 6 and 8. One terminal of the secondary winding of this transformer 38 is connected to the anode of the valve V4 while its other terminal is connected through a "weld time" network 40 and the bus 6 to the cathode of the valve V4. In this manner the cathode potential of the valve V4 will be maintained at that of the bus 6. Since the grid of the valve V4 is connected to the anode of the valve V3 the grid to cathode bias of valve V4 controlled by the potential appearing across the timing network 36 and the conductivity of valve V4 will be controlled by the conduction of valve V3.

The companion valve V5 of the network 14 has its cathode connected to the bus 6 and its anode connected through the biasing network 44 to the bus 28. The grid of this valve V5 is connected to the weld time network 40 adjacent the transformer 38 so that the potential drop across the network 40 is reflected as a negative bias potential between the grid and cathode of the valve V5.

The "hold time" network 16 comprises the valve V6, the anode of which is connected through the timing network 46 to the bus 6 and its cathode of which is directly connected to the bus 28. The grid of the valve V6 is connected to the anode of the valve V5 so that the potential of the grid of the valve V6 with respect to its associated cathode will be the same as the potential drop across the network 44. As stated before, the lead wire 42 is also connected to the anode of the valve V5 so that the potential appearing between the screen grid of the valve V8 and its associated cathode will be the same potential as that appearing across the network 44.

The "off-time" network comprises the valve V7, the cathode of which is connected to the bus 6 and the anode of which is connected through the timing network 26 to the bus 28. The grid of the valve V7 is connected to the anode of the valve V6 whereby the grid to cathode bias of the valve V7 is that appearing across the network 46.

It is believed that the remainder of the details of construction will best be described by reference to the description of operation of the network as follows:

Upon energization of the primary winding 2 of the transformer 1, the secondary winding 4 provides an alternating potential between the busses 6 and 8. The valves V1 and V2 are held nonconductive due to the open condition of the switch Sw and the contacts a of the relay Rr1. The valve V3 is held nonconductive due to the open condition of the contacts b of the relay Rr1. The valve V4 will conduct since there is no blocking bias set up by the network 36 to hold the grid of the valve V4 in a condition to block the valve. Conduction of the valve V4 maintains a potential drop across the network 40 which potential drop is applied as a negative grid to cathode bias on the valve V5 so that even after closure of the switch Sw1 and contacts a of the relay Rr1, the valve V5 will be maintained blocked. The valves V5, V6, V7 and V8 will all be held nonconductive due to the open condition of the contacts a of the relay Rr1 and the switch Sw. During the idle or standby operation, current will flow from the bus 6 to charge the capacitor C3 due to the anodic action of the grid of the valve V3. The capacitor C3 therefore becomes charged at the polarity indicated in the drawings.

Closure of the switch Sw completes the anode circuit of valves V1 and V2 whereby they conduct in successive half cycles, energizing the relay Rr1 and causing its contacts a, b, and c to close. Closure of contacts a completes a holding circuit in parallel with the switch Sw whereby opening of the switch Sw will not affect further operation of the system. Closure of contacts b connects bus 32 to bus 8 whereby the cathode of valve V3 is brought to the potential of bus 8 and the timing condenser C3 starts to time out. Closure of contacts a also connects bus 28 to bus 8 to supply anode potential to the valves V5, V6, V7 and V8.

At this time the valves V5 and V8 will be held blocked by their controlling grids, the valve V5 by the drop across network 40 and the valve V8 by the drop across the network 36. As a further consequence of closure of contacts a of relay Rr1, valve V3 will become conductive establishing a potential drop across the network 46 which will establish a blocking bias between the grid and cathode of the valve V7 maintaining this valve blocked. Closure of the contacts c completes an obvious circuit for the mechanism 60 which in any well known manner initiates movement of the welding electrodes, not shown, into clamping position.

The capacitor C3 of the network 36 was originally charged as indicated and will hold the grids of the valves V3 and V8 negative with respect to their respective cathode and the valves V3 and V8 will now be held blocked. Subsequent to a predetermined time, sufficient to complete the clamping movements of the electrodes, the charge on the capacitor C3 will leak off through the resistor R3 raising the potential of the grids of the valves V3 and V8 so that they are no longer blocked and the valves V3 and V8 will conduct. Thereupon, current will flow from the bus 6 through the conductor 34, the energizing winding of the relay Rr2, the valve V8 through the bus 28 and contacts a of the relay Rr1 to the bus 8. Energization of the relay Rr2 closes its contacts a which energize the welding current control 62 through an obvious circuit, which thereupon, in any well known manner, causes current to flow between the electrodes, not shown. For example, control 62 may correspond to the pilot switch of Joseph Slepian in Patent No. 2,165,911, granted July 11, 1939.

Upon conduction of the valve V3, a potential is set up across the network 30 whereby the grid of the valve V4 is made negative with respect to the cathode and the valve V4 will be blocked. Blocking of the valve V4 permits the capacitor C4 of the network 40 to discharge through the resistor R4. At the end of a predetermined time interval known as the "welding time," the charge on the condenser C4 will have diminished sufficiently to remove the blocking bias potential between the grid cathode of the valve V5 whereby the valve V5 commences to conduct, setting up a potential drop across the network 44 which potential drop is applied by means of the conductor 42 and bus 28 between the screen grid and cathode of the valve V8 whereby this valve is rendered nonconductive thereby de-energizing the relay Rr2 and causing the contracts a thereof to open. This action terminates the flow of welding current between the electrodes, not shown.

This potential appearing across the network 44 is also applied between the grid and cathode of the valve V6 whereby this valve V6 is blocked permitting the discharge of the capacitor C6 through its associated resistor R6. After a sufficient time of discharge known as the "hold time" (long enough to enable the work to cool enough to permit release of the electrode pressure), the charge on the condenser C6 will have diminished sufficiently to remove the blocking bias potential between the grid cathode of the valve V7 whereby the valve V7 will commence to conduct. Conduction of the valve V7 establishes a potential drop across the network 26 which potential drop is applied between the grid and cathode of the valve V1 rendering this valve non-conductive. Immediately upon termination of the half cycle following the half cycle in which the valve V1 has been held against conduction the valve V2 will cease to conduct and the relay Rr1 will be de-energized causing the contacts a, b, and c thereof to open.

Opening of its contacts a opens the holding circuit around the switch Sw and is without effect the switch Sw is closed but if the switch Sw is open will prevent a subsequent conduction of the valves V1 and V2 and will open the anode circuits of the valves V5, V6, V7 and V8. Opening of its switch contacts b breaks the anode circuit through the valve V3 whereby the valve V3 ceases to conduct and permits the bus 32 to assume the potential of the bus 6 whereby the condenser C3 will again be recharged. The condenser C1 will discharge through its associated resistor R1 and remove the blocking bias potential between the grid and cathode of the valve V4 permitting it to again conduct setting up a potential across the network 40. This potential of network 40 puts a blocking bias between the grid cathode of the valve V5. If the switch Sw is open, valves V5, V6, V7 and V8 will already be nonconducting but if the switch Sw is closed the valve 5 will become blocked due to the grid bias to permit the network 44 to discharge thereby removing the blocking bias between the grid valve of the valve V6. Removal of this bias permits this valve to again conduct and set up a blocking bias between the grid cathode of the valve V7 blocking this valve and initiating the discharge of the capacitor C7 through the resistor R7. The discharge time of condenser C7 determines the "off time" of the apparatus. Immediately upon reduction of this potential drop across the network 26 to a sufficient amount the potential of the grid of the valve V1 is raised sufficiently with respect to the potential of the cathode of this valve V1 whereby the valve V1 will again conduct initiating a subsequent operation as just described. If during this time the switch Sw was opened the network will remain in standby condition ready for subsequent operation upon closure of the switch Sw.

It will be apparent that, if desired, instead of the back-to-back arrangement of the valves V1 and V2 a single valve V1 could be used to control the energization of the relay Rr1 provided, however, that it had sufficient current carrying capacity to actuate the energizing winding thereof and in which event it is desirable to place a condenser in parallel with the winding Rr1 so that during the half cycles in which the valve V1 did not conduct, the condenser would maintain the valve Rr1 energized. Such condensers are shown in connection with the coils of the other relays of the embodiments disclosed herein. In this event the apparatus in Fig. 1 would require seven valves only instead of the eight as shown.

Figure 2:
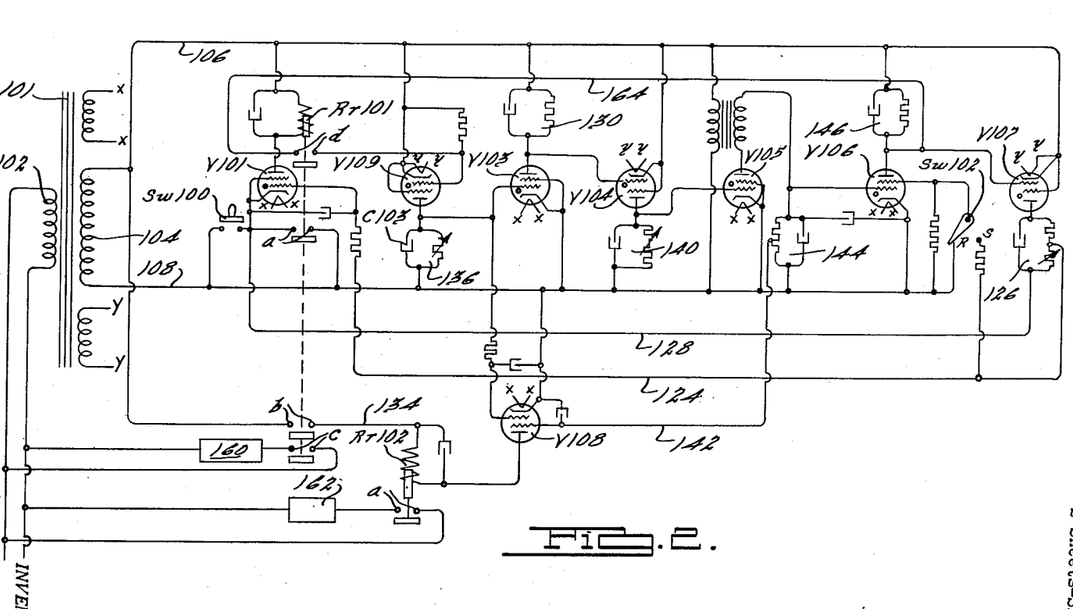
Fig. 2 is a schematic view of a modified form of the invention.

In the showing in Fig. 2 reference characters bearing a number one hundred units higher than those of Fig. 1 are used to indicate similar parts. It is believed that in view of the detailed description of the apparatus of Fig. 1 that the apparatus of Fig. 2 may best be described by a reference to a description of operation thereof which is as follows:

Energization of the primary winding 102 of the transformer 101 causes an alternating potential to be impressed by the secondary winding 104 between the busses 106 and 108. As in the instance in Fig. 1, the valve V101 will be held nonconductive due to the open condition of the switch Sw100 even though there is no blocking bias potential between the control grid and cathode of this valve V101. The valve V109 which charges the clamping time network 136 is normally held conductive whereby the condenser C103 thereof will be charged and the network 136 will have a potential thereacross which is sufficient to maintain a blocking potential between the grid and cathode of the valve V103 whereby this valve is held nonconductive and there will be no potential drop across the network 130 to provide a blocking potential between the control grid cathode of the valve V104 which will conduct. Conduction of the valve V104 will establish a potential drop across the timing network 140 which potential drop is applied between the grid and cathode of the valve V105 maintaining this valve blocked. Since with the valve V105 blocked there is no potential drop across the network 144 and no blocking bias placed between the grid cathode of the valve V106. This valve V106 is normally conductive causing a potential drop to appear across the network 146, which potential drop appears as a blocking potential between the grid and cathode of the valve V107. The valve V107 is also held nonconductive due to the open condition of the switch Sw100 and of the contacts a of the relay Rr101. The valve V108 has its main control grid connected to the usual grid resistor to the anode of the valve V109 whereby the potential existing across the network 136 is applied between the grid and cathode of the valve V108 in the form of a blocking bias. The screen grid of the valve V108 is connected by means of conductor 142 to an intermediate point of the resistor of the network 144 whereby the potential appearing between this point and the bus 108 will appear as a negative blocking potential between the screen grid and cathode of the valve V108. The valve V109 is also held against conduction due to the open contacts b of the relay Rr101.

Upon closure of the initiating or starting switch Sw100, the cathode of the valve V101 is connected to the bus 108 and since, as described above, this valve V101 is in a condition ready to conduct, it will conduct energizing the relay Rr101. Energization of the relay Rr101 closes the contacts a, b, c and d thereof. Closure of the contacts a establishes a holding circuit in parallel with the switch Sw101 whereby subsequent reopening of the switch Sw101 will be without effect upon the continued operation of the apparatus. Closure of the contacts b prepares a circuit for the energizing winding of the relay Rr102 through the conductor 134 to the bus 106, but subject to the now blocked valve V108. Closure of the contacts c establishes an obvious circuit for the control mechanism 160 whereby the welding electrodes (not shown) are brought into contact with the work prior to welding. Closure of the contacts d completes a circuit between the controlling grid of the valve V109 through the conductor 164 to the anode of the valve V106 whereby the potential drop across the network 146 is applied as a negative bias between the control grid and cathode of the valve V109 and blocks this valve.

Blocking of the valve V109 initiates the timing function of the network 136. After a predetermined time interval which is the "clamping time," the negative or blocking bias appearing between the control grid and cathode of the valve V103 is removed whereby the valve V103 will conduct. This also removes the blocking bias between the control grid and cathode of the valve V108 whereby the valve V108 conducts. Conduction of the valve V108 energizes the relay Rr102 whereby its contacts a are closed to energize the welding current control 162 through an obvious circuit whereby the flow of welding current to the electrode is initiated. It will be understood that at this time the valve V105 is in blocked condition so that there is no potential drop across the network 144 to establish a blocking bias potential between the screen grid and cathode of the valve V108.

Conduction of this valve V103 sets up a potential drop across the network 130 which is applied between the control grid and cathode of the valve V104 as a negative or blocking bias thereby blocking this valve. Blocking of the valve V104 initiates the timing function of the network 140 and the discharge time thereof establishes the time during which welding current is flowing to the electrodes or the "welding time."

Upon timing out of the network 140, the negative bias between the grid and cathode of the valve V105 is removed permitting this valve to conduct and set up a potential drop across the network 144. A portion of this potential drop across the network 144 is applied between the screen grid and cathode of the valve V108 by means of the conductor 142 whereby the valve V108 is blocked de-energizing the relay Rr102 causing the contacts a thereof to open and the control 162 to terminate flow of welding current. This potential drop across the network 144 also appears as a blocking potential between the control grid and cathode of the valve V106 blocking this valve. Blocking of the valve V106 initiates the discharge function of the network 146 which after a predetermined time interval known as the "hold time" will have discharged sufficiently to remove the blocking potential between the control grid and cathode of the valve V107. Conduction of the valve V107 establishes a potential drop across the network 126 which potential drop is applied by means of the conductors 124 and 120 between the control grid and the cathode of the valve V101 blocking this valve. Blocking of the valve V101 de-energizes the relay Rr101 whereby its contacts a, b, c and d thereof open.

Let us assume first that the switch Sw100 has been opened previously to this instant. In such event, opening of the contacts a will disconnect the cathode of the valve V101 and of the anode of the valve V107 from the bus 108 and the valves V101 and V107 cannot again conduct until a subsequent closure of the switch Sw100. Opening of the contacts b positively insures that the relay Rr102 cannot again be energized even though certain control biases may be removed from the grids of the valves V108. Opening of the contacts c de-energizes the clamping control 160 whereby the electrodes will move away from the work. Opening of the contacts d is without effect since at this time there was no potential drop across the network 146 and consequently no blocking bias between the grid and cathode of the valve V109. Valve V109 became conductive substantially simultaneously with the conduction of the valve V107 blocking the valve V103 rendering the valve V104 conductive. Conduction of the valve V104 blocks the valve V105 and blocking of the valve V105 renders the valve V106 conductive. The time required to render the valve V106 conductive subsequent to the rendering of the valve V109 conductive is greater than the time required for the network 126 to block the valve V101. Upon conduction of the valve V106 and the setting up of the potential drop across the network 146 the control grid of the valve V107 will be rendered negative with respect to the cathode thereof and the valve V107 will be held blocked. Since the switch Sw100 is open, conduction through the valve V107 was terminated and it will be apparent that the apparatus is reset to its initial condition ready for a subsequent operation by closure of the switch Sw100.

If, however, the switch Sw100 is still closed at this time, the valve V107 will continue to conduct and remain conductive until blocked by a negative bias between the grid and cathode thereof which occurs upon reconduction of the valve V106. It should here be remembered that blocking of the valve V106 as described above removes the blocking bias on the valve V109 whereby it again becomes conductive initiating a sequence of operation by which valves V103 and V105 become nonconductive and valves V104 and V106 become conductive.

Upon blocking of the valve V107 the network 126 will commence to discharge and after a predetermined time interval known as the "off time," the potential appearing across the network 126 will drop sufficiently to remove the negative blocking bias between the grid and cathode of the valve V101 which valve V101 will then commence to reconduct and initiate a subsequent operation as above described.

It has been assumed from the foregoing that the switch Sw102 is in the shown position in which the screen grid of the valve V106 is connected to the bus 108. If it is desired to make only a single welding operation even though the switch Sw100 is maintained closed, switch Sw102 is moved from its shown position in which it is connected to the contact R to the opposite position in which it is connected to the contact S of the switch Sw102 and in which it connects the screen grid of the valve V106 to the conductor 124 so that a portion of the potential drop appearing across the timing network 126 is placed between the screen grid and cathode of the valve V106. With the switch Sw100 maintained closed the anode circuit of the valve V107 will not be opened and the valve V107 will conduct until such time as it may be blocked by its controlling grid. This blocking by the controlling grid cannot occur however because to place this blocking bias between the grid and cathode of the valve V107 requires the valve V106 to conduct. Conduction of the valve V106 is prevented due to the potential drop appearing across the network 126 and consequently the valve V107 will continue to conduct until opening of the switch Sw100. As long as the valve V106 continues to be blocked, the valve V109 will continue to conduct and as long as the valve V109 conducts no subsequent conduction of the valve V103 or valve V108 may occur. As indicated, to reset the mechanism the switch Sw100 is opened permitting the network 126 to discharge and then if subsequently closed an additional welding cycle as described above will be initiated.

What is claimed and is desired to be secured by United States Letters Patent is as follows:

1. In a timing apparatus, a plurality of terminals adapted to be energized from an alternating current source, a plurality of electronic valves each having a pair of main electrodes, a first electric circuit for connecting the pair of main electrodes of one of said valves between a pair of said terminals, a relay having circuit controlling contacts and an energizable winding for controlling the condition of said contacts, said winding being arranged in said electric circuit with said one valve whereby change in conduction of said one valve actuates said relay, a second of said valves having a controlling electrode, a storage device connected between one of said terminals and said controlling electrode, a second electric circuit including an impedance means connecting one of said pair of main electrodes of said second valve to a first of said terminals, a third electric circuit including said contacts for effectively connecting the other of said second valve main electrodes successively to said one terminal and to another of said terminals, a fourth electric circuit for supplying the main electrodes of a third of said valves with an alternating potential having the same frequency as that of said source, said third valve having a control electrode, a fifth conductor means connecting said third valve control electrode to said second electric circuit intermediate said second valve one electrode and said impedance means.

2. In a timing apparatus, a transformer having a primary winding adapted to be energized from a source of alternating current energy and having a secondary winding having a plurality of terminals, a plurality of electronic valve means arranged for sequential operation and each having an anode and a cathode and a control electrode, circuit means connecting a first of said valve means between two of said terminals to provide at a given instant a positive to negative potential drop between its anode and cathode, a first switch means actuated as a consequence of a change in current flow through said first valve means, a second switch means connected in said circuit means for selectively controlling the energization of said circuit means and operable to initiate current flow through said first valve means, said first switch acting, when said current flow occurs through said first valve means, to provide a holding circuit in parallel with said second switch means, closure of one of said switch means being operable to initiate a sequential operation of the remainder of said valve means, further circuit means for connecting said anode and said cathode of the last actuated of said valve means between two of said terminals to provide at said instant a negative to positive potential drop between its anode and cathode, impedance means connected intermediate said last valve means anode and said transformer, and circuit means for applying at least a portion of the potential appearing across said last-named impedance means between said control electrode and said cathode of said first valve means.

3. In a timing apparatus, a transformer having a primary winding adapted to be energized from a source of alternating current energy and having a secondary winding having a plurality of terminals, a plurality of electronic valve means arranged for sequential operation and each having an anode and a cathode and a control electrode, circuit means connecting a first of said valve means between two of said terminals to provide at a given instant a positive to negative potential drop between its anode and cathode, a first switch means actuated as a consequence of change in current flow through said first valve means, a second switch means connected in said circuit means for selectively controlling the energization of said circuit means and operable to initiate current flow through said first valve means, said first switch acting, when said current flow occurs through said first valve means, to provide a holding circuit in parallel with said second switch means, closure of one of said switch means being operable to initiate a sequential operation of the remainder of said valve means, further circuit means connecting said anode and said cathode of the last actuated of said valve means between two of said terminals to provide at said instant a negative to positive potential drop between its anode and cathode, impedance means connected intermediate said last valve means anode and said transformer, and a conductor connecting said impedance means to said first valve means control electrode.

4. In a timing apparatus, a transformer having a primary winding adapted to be energized from a source of alternating current energy and having a secondary winding having a plurality of terminals, a plurality of electronic valve means arranged for sequential operation and each having an anode and a cathode and a control electrode, circuit means connecting a first of said valve means between two of said terminals to provide at a given instant a positive to negative potential drop between its anode and cathode, a first switch means actuated as a consequence of change in current flow through said first valve means, a second switch means connected in said circuit means for selectively controlling the energization of said circuit means and operable to initiate current flow through said first valve means, said first switch acting, when said current flow occurs through said first valve means, to provide a holding circuit in parallel with said second switch means, closure of one one of said switch means being operable to initiate a sequential operation of the remainder of said valve means, further circuit means for connecting said anode and said cathode of the last actuated of said valve means between two of said terminals to provide at said instant a negative to positive potential drop between its anode and cathode, said first switch means acting to maintain energization of said last-named connecting means and operable upon said current flow through said first valve means to maintain said drop between said last valve means anode and cathode, impedance means connected intermediate said last valve means anode and said transformer, and circuit means for applying at least a portion of the potential appearing across said last-named impedance means between said control electrode and said cathode of said first valve means.

5. In a timing apparatus, a transformer having a primary winding adapted to be energized from a source of alternating current energy and having a secondary winding having a plurality of terminals, a plurality of electronic valve means arranged for sequential operation and each having an anode and a cathode and a control electrode, circuit means connecting a first of said valve means between two of said terminals to provide at a given instant a positive to negative potential drop between its anode and cathode, a first switch means actuated as a consequence of change in current flow thorugh said first valve means and having a pair of sets of circuit controlling contacts, a second switch means connected in said circuit means for selectively controlling the energization of said circuit means and operable to initiate current flow through said first valve means, one of said sets of contacts acting, when said change in current flow occurs through said first valve means, to provide a holding circuit in parallel with said second switch means, another of said sets of contacts acting upon said change in current flow through said first valve means to close an initiating circuit to provide for sequential operation of the remainder of said valve means, further circuit means including said one set of contacts for connecting said anode and said cathode of the last actuated of said valve means between two of said terminals to provide at said instant a negative to positive potential drop between its anode and cathode, impedance means connected intermediate said last valve means anode and said transformer, and circuit means for applying at least a portion of the potential appearing across said last-named impedance means between said control electrode and said cathode of said first valve means.

6. In a timing apparatus, a pair of current conducting busses, means adapted to connect said busses across a source of alternating potential, a plurality of pairs of discontinuous-type electronic valve means arranged for successive operation and each having an anode and a cathode and a control electrode, a first valve means of each said pair of valve means having its anode connected to one of said busses and having its cathode connected to the other of said busses, the second valve means of each said pair of valve means having its cathode connected to said one bus and its anode connected to said other bus, impedance means connected intermediate each said anode and the bus to which it is connected, circuit controlling means arranged to control the flow of current through said first valve means of the first of said pairs of valve means, means responsive to the energization of the respective impedance means associated with each said first valve means for controlling the conductivity of the respective each said second valve means, means responsive to the energization of the respective impedance means associated with each said second valve means except the last to operate of said second valve means for controlling the conductivity of said first valve means of the next successive pair of valve means, at least one of said last-named means comprising a valve means having an anode and a cathode connected for energization from a transformer having its primary connected to receive a voltage of a frequency proportional to that between said busses, and circuit means for applying at least a portion of the potential drop across the said impedance means associated with said second valve means of the last of said successive pairs between said control electrode and said cathode of said first valve of said first successive pairs of valve means.

7. In a timing system adapted to be energized from a source of alternating electrical energy, a first valve, an electric circuit connecting said first valve to said source and including first and second switch means for controlling the energization of said circuit, said second switch means being controlled in accordance with a conducting condition of said valve and operable upon initial conduction of said valve to maintain said valve energized irrespective of said first switch means, a second valve means having a plurality of main electrode means and controlling electrode means, said second valve means having a plurality of controlling functions, means connecting said second valve means to said source, a first dischargeable source of potential bias voltage connectible between said second valve means controlling electrode means and one of said second valve means main electrode means and of such polarity that when applied between said second valve means controlling electrode means of said second valve means and said one main electrode means of said second valve means said second valve means is held against conduction, means actuated as a consequence of the conduction of said first valve for connecting said potential bias voltage between said control electrode means and said one electrode means of said second valve means whereby said second valve means is initially held non-conductive and rendered conductive subsequent to a predetermined time interval subsequent to conduction of said first valve, a third valve having main electrodes and a control electrode, a second source of potential bias connected between the control electrode of said third valve and one of said third valve main electrodes and operable to place a blocking bias voltage between said third valve control electrode and said third valve one main electrode whereby conduction of said third valve is prevented, said second source of potential bias being dischargeable to permit conduction of said third valve, the initiation of the discharge of said second source of potential bias being a said function of said second valve means, another of said functions of said second valve means being to energize a control circuit, and a third source of potential bias operable to render said second valve means ineffective to perform said other function, said third potential bias source being normally maintained ineffective and rendered effective as a consequence of conduction of said third valve.

8. In a timing system adapted to be energized from a source of alternating electrical energy, a first valve having main electrodes, circuit means including switch means connecting said electrodes to said source, switch means controlled in accordance with a conducting condition of said valve and operable upon initial conduction of said valve to maintain said valve energized irrespective of said first-named switch means, a second valve means having a plurality of main electrode means and controlling electrode means, said second valve means having a plurality of controlling functions, means connecting said second valve means to said source, a first dischargeable source of potential bias voltage having a pair of terminals, one of said terminals being connected to said second valve means controlling electrode means and connectable to one of said second valve means main electrode means and of such polarity that when connected between said controlling electrode means of said second valve means and one main electrode means of said second valve means said second valve means is held against conduction, means actuated as a consequence of the conduction of said first valve for connecting the other of said terminals to said one electrode of said second valve means whereby said second valve means is held non-conductive for a predetermined time interval subsequent to conduction of said first valve, a third valve having main electrodes and a control electrode, a second source of potential bias normally maintaining a block bias voltage between the control electrode of said third valve and one of said third valve main electrodes whereby conduction of said third valve is prevented, said second source of potential bias being dischargeable to permit conduction of said third valve, the initiation of the discharge of said second source of potential bias being a said function of said second valve means, another of said functions of said second valve means being to energize a control circuit, a third source of potential bias operable to render said second valve means ineffective to perform said other function, said third potential bias source being normally maintained ineffective and rendered effective as a consequence of conduction of said third valve.

9. In a timing system adapted to be energized from a source of alternating electrical energy, a first valve having a pair of main electrodes and a control electrode, means for connecting said main electrodes across said source including a first switch means, a second switch means controlled in accordance with a conductive condition of said valve and operable upon initial conduction of said valve to maintain said valve energized, a second valve means having a plurality of main electrode means and controlling electrode means and having a plurality of controlling functions, means including said second switch means connecting said second valve means to said source, a first dischargeable source of potential bias voltage having a pair of terminals, one of said terminals being connected to said second valve means controlling electrode means and connectable to one of said second valve means main electrode means and of such polarity that when applied between said controlling electrode means of said second valve means and said one main electrode means of said second valve means said second valve means is held against conduction, means actuated as a consequence of the conduction of said first valve for connecting the other of said terminals to said one electrode of said second valve means and said last mentioned one electrode to said source whereby said second valve means is connected across said source and held non-conductive for a predetermined time interval subsequent to conduction of said first valve, a third valve having main electrodes and a control electrode, a second source of potential bias normally maintaining a blocking bias voltage between the control electrode of said third valve and one of said third valve main electrodes whereby conduction of said third valve is prevented, said second source of potential bias being dischargeable to permit conduction of said third valve, the discharge of said second source of potential bias being one of the functions of said second valve means plural functions, another of said plurality functions of said second valve means being to energize a control circuit, a dischargeable source of potential bias operable to render said second valve means ineffective to perform said other plural function, said potential bias source being normally maintained ineffective and rendered effective as a consequence of conduction of said third valve.

10. In a timing apparatus, a plurality of electronic valves each having a pair of main electrodes, a first means for connecting an alternating potential source between said pairs of electrodes of one of said valves, a relay having circuit controlling contacts and an energizable winding for controlling the condition of said contacts, said winding being arranged in circuit with said one valve whereby change in conduction of said one valve actuates said relay, a second of said valves having a controlling electrode, an energy storage device connected to one side of said potential source and to said controlling electrode, means including an impedance device connecting one of said pair of main electrodes of said second valve to one side of said source, a third means including said contacts for effectively connecting the other of said second valve main electrodes to either side of said source.

11. In a timing system, a plurality of electronic valves arranged to operate in sequence for controlling a plurality of timing functions, at least the first and last to be actuated of said valves having an anode and a cathode and a control electrode, a first network for connecting an alternating potential between said anode and said cathode of said first and said last to be actuated valves, and polarized to provide a positive to negative potential anode to cathode of said first to be actuated valve during one half cycle of said alternating potential and a positive to negative potential anode to cathode of said last to be actuated valve during the other half cycle of said alternating potential, said anode of said last to be actuated valve and said cathode of said first to be actuated valve being connected to one another, and switch means for selectively disconnecting said last-mentioned anode and cathode from said alternating potential.

12. The combination of claim 11 in which means responsive to current flow through one of said valves is provided to actuate said switch means.

13. The combination of claim 12 in which another of said valves has a cathode and an anode and a control electrode, said network includes a second conductor connected through an impedance element to one side of said alternating potential and connectable by said switch means to the other side of said alternating potential, and an energy storage means is connected between said other valve control electrode and said other side of said alternating potential.

14. In a timing apparatus, a plurality of electric valves each having a pair of main electrodes, a relay having an energizable winding and circuit controlling contacts, a first circuit means including said winding for connecting an alternating potential between said pair of electrodes of one of said valves, a second of said valves having a controlling electrode, a storage device having a pair of terminals, one of said terminals being connected to said controlling electrode, a second circuit means connecting one of said second valve main electrodes to one terminal of a pair of terminals adapted to be supplied from a source of alternating potential and including an impedance element, a third circuit means connecting said second valve one main electrode to the other of said source terminals and including at least one of said relay contacts, and circuit means connecting the other of said storage device terminals to said alternating current source other terminal.

15. In a timing apparatus, a plurality of electric valves each having a pair of main electrodes, a relay having an energizable winding and at least two circuit controlling contacts, a first circuit means for connecting an alternating potential source between said pair of electrodes of one of said valves, said first circuit means including said winding and one of said two contacts, a second of said valves having a controlling electrode, a capacitor having a pair of terminals, one of said capacitor terminals being connected to said controlling electrode, a second circuit means connecting one of said second valve main electrodes to one terminal of a pair of power terminals adapted to be supplied from a source of alternating potential and including an impedance element, a third circuit means connecting said second valve other main electrode to the other of said power terminals and including a second of said two contacts, circuit means connecting the other of said capacitor terminals to said other power terminal, and switch means arranged in said first circuit means in by-pass arrangement with said one relay contact.

16. In a timing apparatus, a plurality of electric valves each having a pair of main electrodes and a control electrode, a relay having an energizable winding and circuit controlling contacts, a first circuit means including said winding, and also including at least one of said contacts, for connecting an alternating potential source between said pair of electrodes of one of said valves, a capacitor having a pair of terminals, one of said capacitor terminals being connected to said control electrode of a second of said valves, a second circuit means connecting a first main electrode of said second valve to one terminal of a pair of power terminals adapted to be supplied from a source of alternating potential and including an impedance element, a third circuit means connecting said first main electrode to the other of said power terminals and including at least one of said relay contacts, a fourth circuit means connecting the other of said capacitor terminals to said other power terminal, a fifth circuit means for supplying alternating potential to the main electrodes of a third of said valves including an impedance element, and circuit means for applying at least a portion of the potential appearing across said last named impedance element as a blocking bias potential between said control electrode of said one valve and a first main electrode of said one valve.

17. The combination of claim 16 in which said first main electrodes are cathodes, said one valve and said third valve being polarized so that at a given instant said one valve cathode is positive with respect to said one valve anode and said third valve cathode is negative with respect to said third valve anode, and said last named impedance element is intermediate said third valve anode and the one of said power terminals to which it is connected.

18. In a timing apparatus, a transformer having a primary winding adapted to be energized from a source of alternating current energy and having a plurality of secondary terminals, a plurality of electric valve means arranged for sequential operation and each having an anode and a cathode and a control electrode, a first switch means having an actuating winding and a plurality of normally open pairs of contacts, circuit means connecting a first of said valve means between two of said terminals and including said switch means actuating winding and at least one of said normally open contacts to provide at a given instant a positive to negative potential anode to cathode of said first valve means, a second switch means connected in said circuit means and operable upon closure to initiate current flow through said first valve means, said one normally open contact being in parallel arrangement with said second switch means to provide a holding circuit, circuit means connecting a second of said valve means between two of said terminals and including at least one of said normally open contacts whereby upon energization of said winding electrical potential is supplied between said second valve means anode and cathode, circuit means connecting a third of said valve means between two of said terminals and including at least one of said normally open contacts, said last named circuit means being arranged to provide at said one instant a negative to positive potential anode to cathode of said third valve means, said last named circuit means further including an impedance connected in series with said third valve means anode and cathode, and circuit means for applying at least a portion of the potential appearing across said last named impedance between said control electrode and said cathode of said first valve means.

19. The combination of claim 18 in which circuit means is provided to connect a fourth said valve means between two of said terminals to provide at said one instant a positive to negative potential between said fourth valve means anode and cathode, said last named circuit means including an impedance connected intermediate said fourth valve means anode and the one of said terminals to which said fourth valve means anode is connected, and circuit means connecting said third valve means control electrode and said fourth valve means anode.

20. In a timing system adapted to be energized from a source of alternating electrical energy, a first valve having a main electrode and a control electrode and connected across said source and including a switch means controlling energization thereof, switch means controlled in accordance with a conducting condition of said valve and operable upon initial conduction of said valve to maintain said valve energized irrespective of said first-named switch means, a second valve having a pair of main electrodes and a controlling electrode, said second valve having a plurality of controlling functions, means connecting said second valve main electrodes across said source, a first dischargeable source of potential bias voltage connected between said second valve controlling electrode and one of said second valve main electrodes and of a polarity to hold said second valve against conduction, means actuated as a consequence of the conduction of said first valve for applying said potential bias voltage whereby said second valve is held nonconductive, a third valve having a pair of main electrodes and a controlling electrode, means connecting said third valve main electrodes across said source, a second dischargeable source of potential bias voltage energized as a consequence of conduction of said second valve and connected between said third valve controlling electrode and one of said third valve main electrodes, a fourth valve having main electrodes and a control electrode, a third energizable potential means connected between said fourth valve control electrode and one of said fourth valve main electrodes and energizable as a consequence of current flow through said third valve to place a blocking bias voltage between said fourth valve control electrode and said fourth valve one main electrode whereby conduction of said fourth valve is prevented, a fifth valve having main electrodes and a control electrode, a fourth dischargeable potential means connected between said fifth valve control electrode and one of said fifth valve main electrodes and energizable as a consequence of conduction of said fourth valve to place a blocking bias voltage between said fifth valve control electrode and said fifth valve one main electrode whereby conduction of said fifth valve is prevented, said fourth dischargeable means being dischargeable as a consequence of said fourth valve being rendered blocked to permit conduction of said fifth valve, the unblocking of said third valve and blocking of said fourth valve to initiate a discharge of said fourth dischargeable means being a said function of said second valve, another of said second valve functions being to energize a control circuit, a sixth valve having main electrodes and a control electrode, a fifth source of potential bias, circuit means energized by said fifth source and operable to render said sixth valve blocked whereby said first dischargeable source is discharged and also operable to de-energize said control circuit, a seventh of said valves having a pair of main electrodes and a control electrode, circuit means connecting said main electrodes of said seventh valve across said source and including a sixth impedance in series circuit with said seventh valve main electrodes, means connecting said seventh valve control electrode to one of said sixth valve main electrodes, and circuit means applying a potential established by said sixth impedance between said first valve electrodes.

References Cited in the file of this patent

UNITED STATES PATENTS

| Number | Name | Date |
|---|---|---|
| 2,333,363 | Collom | Nov. 2, 1943 |
| 2,403,955 | Schlesinger | July 16, 1946 |
| 2,463,318 | Schneider | Mar. 1, 1949 |
| 2,471,834 | McDowell | May 31, 1949 |